March 5, 1957

R. N. JUNGLES 2,783,861

DRIVE-RELEASED BRAKE

Filed Nov. 29, 1954

*INVENTOR.*
ROBERT N. JUNGLES
BY
*John E. Renfer*
*ATTORNEY*

United States Patent Office 2,783,861
Patented Mar. 5, 1957

2,783,861

DRIVE-RELEASED BRAKE

Robert N. Jungles, Parma, Ohio, assignor to The Cleveland Pneumatic Tool Company, Cleveland, Ohio, a corporation of Ohio Application November 29, 1954, Serial No. 471,610

2 Claims. (Cl. 192—8)

This invention relates generally to a brake mechanism and more particularly to a coupling for connecting a drive shaft and a driven shaft incorporating a brake mechanism and control therefor which prevents the driven shaft from supplying power to the drive shaft.

In many mechanisms, operational control as well as power should be derived from a single source and means must be provided to eliminate power effected from all other sources. This is particularly true in actuators and jacks incorporating antifriction ball bearing screws since an axial load on such a device will normally create rotational torque sufficient to overcome the inherent friction. This invention is therefore directed to a coupling for connecting the drive and driven shafts of such a device providing brake means and automatic controls which eliminate rotation of the driven shaft except in response to rotation of the driving shaft.

It is an important object of this invention to provide a new and improved automatically actuated brake mechanism.

It is another object of this invention to provide a new and improved automatic control for a brake mechanism.

It is still another object of this invention to provide a coupling for connecting a drive shaft and a driven shaft which includes an automatic brake mechanism which prevents power from being transmitted from the driven shaft to the drive shaft.

Further objects and advantages will appear from the following description and drawings, wherein.

Figure 1:
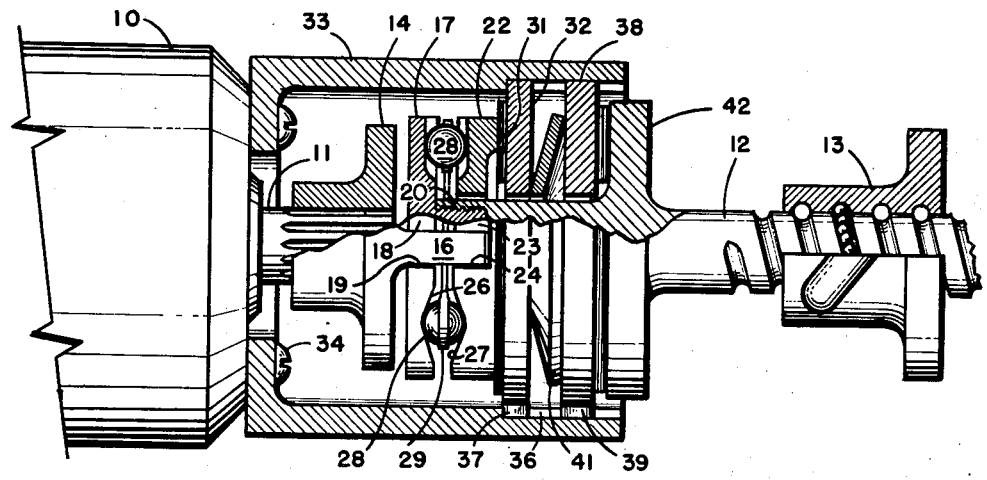
Figure 1 is a side elevation partially in longitudinal section of a coupling incorporating a brake and control according to this invention, shown as it would be applied to a motor driven ball screw mechanism.

Reference should be made to the drawings wherein an electric motor 10 having a drive shaft 11 is connected to a driven shaft 12 by a coupling according to this invention. The driven shaft 12 is shown as the screw of a ball screw mechanism provided with a nut 13 which is adapted to receive axial loads. For purposes of simplicity the bearings of the driven shaft are not shown. However, it should be understood that the driven shaft 12 should be journaled for rotation about the same axis as the drive shaft 11.

A driving member 14 is splined on the drive shaft 11 and is provided with a plurality of symmetrically located axially extending arms 16. Mounted on the driven shaft 12 adjacent to the driving member 14 is a driven member 17 fixed on the end of the driven shaft 12 by any suitable means such as a screw threaded connection 20 and formed with a plurality of peripheral notches 18, each providing circumferentially spaced radial walls 19 and 21 proportioned for engagement by the arms 16. Adjacent to the driven member 17 is a floating brake member 22 formed with a plurality of peripheral notches 23, each providing circumferentially spaced radial walls 24 and 25 also proportioned for engagement by the arms 16. The circumferential spacing of the walls 19 and 21 and the walls 24 and 25 is greater than the width of the arms 16 so that a lost motion connection is provided between the driving member 14 and the other members.

Figure 2:
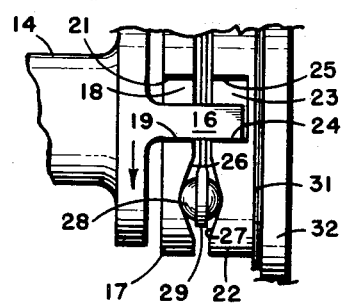
Figure 2 is a fragmentary side elevation showing the position of the elements of the brake actuating assembly when the brake is not applied.

The driven member 17 and the floating brake member 22 are each formed with three equally spaced opposed radially extending V-shaped depressions forming inclined ramps 26 and 27 respectively, arranged so that they will be directly aligned when the walls 19 and 21 are axially aligned with the walls 24 and 25 as shown in Figures 1 and 2. An antifriction ball bearing 28 is positioned in each of the depressions formed by the ramps 26 and 27 and is retained therein by a ball retainer 29.

The floating brake member 22 is provided with a braking surface 31 engageable with an axially movable rotatably fixed brake disc 32. A housing 33 is mounted on the motor 10 by screws 34 and is provided with axially extending keyways 36 which receive lugs 37 formed on the brake disc 32 thus restraining the brake disc 32 against rotational motion while permitting axial motion thereof. A second brake disc 38 is mounted in the housing 33 and is formed with lugs 39 positioned in the keyways 36 in the same manner as the lugs 37. Positioned between the brake discs 32 and 38 is a spring 41 resiliently urging the brake discs apart. Adjacent to the brake disc 38 on the side opposite from the spring 41 is a rotatable brake element 42 which may be integrally formed on the driven shaft 12 as shown or as a separate element rigidly mounted on the driven shaft 12 for rotation therewith.

The proportions of the various elements should be arranged so that the brake disc 32 is urged into light engagement with the floating brake member 22 by the spring 41 even when the bearings 28 are in the position shown in Figures 1 and 2 so that a frictional drag resisting rotation of the floating brake member 22 is always present. Also since the engagement between the brake disc 38 and the brake element 42 is light, very little drag resists the rotation of the driven shaft 12.

In operation the coupling functions to eliminate rotation of the driven shaft 12 except in response to rotation of the drive shaft 11. When the drive shaft 11 rotates the driven shaft 12 against a resisting load, the driven member 17 and the floating brake member 22 are each brought into a neutral or aligned position by the arms 16 wherein the walls 19 and 24 and the walls 21 and 25 are in axial alignment. At this time the ramps 26 and 27 are also axially aligned so the bearings 28 are positioned at the bottom of the ramps as shown in Figures 1 and 2. When the various elements are in this position, the spring 41 approaches its fully extended position and a very small resistance to rotation is created by the engagement between the floating brake member 22 and the brake disc 32 and by the engagement between the brake disc 38 and the brake element 42. Therefore, the motor 10 is able to rotate the driven shaft 12 through the engagement between the arms 16 and either the wall 19 or 21 depending on the direction of rotation with a relatively small frictional loss.

When the motor 10 is shut off, in many instances it is necessary for the nut 13 to remain stationary and support an axial load which would normally be sufficient to overcome the inherent friction in the device and would cause rotation of the driven shaft 12 and in turn the drive shaft 11 if the braking were not provided. Under these conditions the brake is automatically actuated to prevent rotation. If the driven shaft 12 is loaded so that it tends to rotate the driven member 17 in the direction shown by the arrow in Figure 3 when the motor is not supplying power, the driven member 17 will rotate relative to the floating brake member 22 and will cause the bearings 28 to roll along the opposed surfaces of the ramps 26 and 27 causing the floating brake member 22 to move axially relative to the driven member 17. This in turn compresses the spring 41 and increases the axial loading between the floating brake member 22 and the brake disc 32 and in turn increases the axial loading between the brake disc 38 and the brake element 42. This tighter engagement produces larger frictional resistance to rotation on both the floating brake member 22 and the brake element 42 and prevents the driven member 17 from rotating. It should be noted that the axial force between the floating brake member 22 and the brake disc 32 is balanced by the force between the brake disc 38 and the brake element 42 so no axial bearing loads are produced in the driven shaft. In order to prevent slippage between the floating brake member 22 and the brake disc 32 during the application of the brake, the dimensional proportions should be arranged so that the product of the effective radius of the area of frictional engagement between these two elements times the coefficient of the friction of the engagement is greater than the distance of the center of the bearings 28 from the axis of the shafts times the tangent of the angle between the ramp faces and a plane perpendicular to the axis of the shafts. If this condition is met the brake will be self-locking and slippage will be eliminated.

Figure 3:
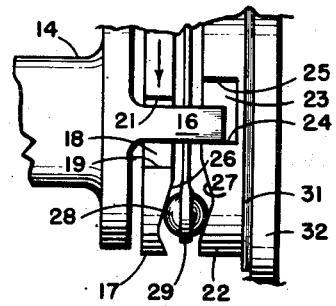
Figure 3 is a view similar to Figure 2 showing the position of the elements when the brake is applied; and, Figure 4 is an exploded pictorial view of the elements of the actuating assembly.
Figure 4:
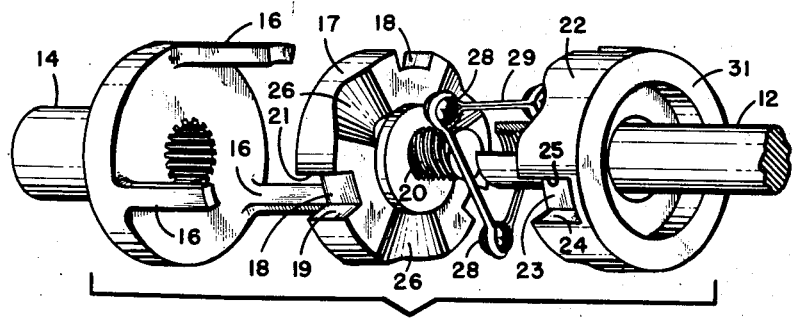

If the motor 10 is energized to drive the driven shaft in the direction of an aiding load; i. e., a load which tends to rotate the driven shaft 12 in the direction of motor rotation, the elements will also assume a position generally shown in Figure 3 and the arms 16 will supply a rotational force against the wall 24 which will cause the floating brake member 22 to slip relative to the brake disc 32 in a direction which would tend to release the brake engagement. As soon as the brake engagement is relieved to the point where it is unable to overcome the torque on the driven shaft 12 applied by the load on the nut 13, the driven shaft 12 will rotate in the direction of motor rotation. Those skilled in the art will recognize that if the driven shaft 12 should rotate faster than the motor 10, the brake engagement will be increased thus causing a snubbing action and if the driven shaft 12 tends to rotate slower than the motor 10 the braking engagement will be relieved thus reducing the amount of torque absorbed by the brake. An equilibrium therefore will be reached and the driven shaft 12 will rotate at the same speed as the motor 10. However, no power can be transmitted from the driven shaft 12 to the motor 10 because the wall 21 does not engage the arms 16 under these conditions. Since the opposing faces of the ramps 26 and 27 are substantially parallel, no jamming of the bearings 28 can occur so chattering is reduced to a minimum and smooth operation is achieved.

If the driving member 14 is rotated by the motor 10 in the direction opposite to that indicated in Figure 2, the arms 16 will engage the walls 21 and 25 and maintain the alignment of the driven member 17 and the floating brake member 22 so that a very small frictional drag will be developed by the brake. Also since the ramps 26 and 27 are symmetrical, the brake will be actuated to resist power effects created by axial loads on the nut 13 in either direction. It is, therefore, apparent that a coupling according to this invention makes it possible for the motor 10 to maintain complete rotational control of the driven shaft 12.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A coupling for connecting a power source to a load comprising a rotatable driving element, a rotatable driven member and a floating member normally in a first position of angular alignment, cam means between said members proportioned to move them axially relative to each other upon relative rotation therebetween in either direction away from said first position, lost motion drive means between said driving element and members proportioned to maintain said members in said first position only when said driving element is rotating said driven member, a pair of non-rotatable axially movable brake discs one frictionally engaging said floating member and the other frictionally engaging said driven member, and spring means resiliently urging said brake discs axially into their respective engagements whereby said floating member and driven member are frictionally restrained against rotation by an equal number of brake discs and relative rotation between said floating member and driven member from said first position increases the force of engagement of said discs.

2. A coupling comprising a driving element rotatable about an axis for connection to a rotatable power source and an annular driven member coaxial with said driving element for connection to a rotatable load, an annular floating member adjacent to said driven member, said members each being formed with opposed V-shaped ramps providing faces on each member inclined relative to a plane perpendicular to said axis substantially parallel and opposite to cooperating faces on the other member, an antifriction bearing positioned between said ramps engageable with said inclined faces whereby relative rotation between said elements from a first position with said ramps aligned causes said bearings to roll along cooperating inclined faces and produce a force urging said members axially apart, lost motion connecting means between said driving element and members proportioned to maintain alignment of said ramps only when said driving element rotates said members, a pair of non-rotatable axially movable brake discs one frictionally engaging said floating member and the other frictionally engaging said driven member, and spring means between said discs resiliently urging them axially apart into their respective engagements whereby said floating member and driven member are frictionally restrained against rotation by an equal number of brake discs and relative rotation between said floating member and driven member from said first position moves said discs together against the force of said spring.

References Cited in the file of this patent

UNITED STATES PATENTS

| 710,757 | Coleman et al. | Oct. 7, 1902 |
| 2,387,039 | Parrett | Oct. 16, 1945 |